United States Patent
Cui et al.

(10) Patent No.: US 12,414,193 B2
(45) Date of Patent: Sep. 9, 2025

(54) DRX BASED UE BEHAVIOR

(71) Applicant: APPLE INC., Cupertino, CA (US)

(72) Inventors: Jie Cui, San Jose, CA (US); Chunxuan Ye, San Diego, CA (US); Dawei Zhang, Saratoga, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,212

(22) PCT Filed: Sep. 24, 2021

(86) PCT No.: PCT/CN2021/120053
§ 371 (c)(1),
(2) Date: Aug. 29, 2022

(87) PCT Pub. No.: WO2023/044691
PCT Pub. Date: Mar. 30, 2023

(65) Prior Publication Data
US 2024/0196472 A1  Jun. 13, 2024

(51) Int. Cl.
*H04W 84/06* (2009.01)
*H04W 76/28* (2018.01)

(52) U.S. Cl.
CPC ............ *H04W 76/28* (2018.02); *H04W 84/06* (2013.01)

(58) Field of Classification Search
None
See application file for complete search history.

(56) References Cited

U.S. PATENT DOCUMENTS

2010/0323683 A1* 12/2010 Kazmi ................. H04W 24/10
455/422.1
2017/0318536 A1* 11/2017 Manepalli ............. H04W 24/02
(Continued)

FOREIGN PATENT DOCUMENTS

| CN | 110876210 A | 3/2020 |
| CN | 112954713 A | 6/2021 |

(Continued)

OTHER PUBLICATIONS

3GPP TR 38.821, "3rd Generation Partnership Project; Technical Specification Group Radio Access Network; Solutions for NR to support non-terrestrial networks (NTN) (Release 16)", V1.0.0, Dec. 2019, 143 pages.

(Continued)

*Primary Examiner* — Benjamin Lamont
(74) *Attorney, Agent, or Firm* — Dorsey & Whitney LLP

(57) ABSTRACT

The disclosure relates to Discontinuous Reception (DRX) based UE behavior. A user equipment (UE) is configured to perform operations comprising: obtaining a first DRX cycle; determining a second DRX cycle at least based on the first DRX cycle and a DRX cycle threshold, wherein the DRX cycle threshold is a highest value of DRX cycle that can support LEO (Low-Earth Orbit) cell measurement; and applying the second DRX cycle, comprising applying the second DRX cycle to measurement of at least one LEO cell of the serving cell and a neighbor cell, wherein at least one of the serving cell and the neighbor cell is a LEO cell.

13 Claims, 8 Drawing Sheets

(56) References Cited

U.S. PATENT DOCUMENTS

| | | | |
|---|---|---|---|
| 2020/0396760 A1 | 12/2020 | Yi et al. | |
| 2021/0377828 A1* | 12/2021 | Tao | H04W 76/28 |
| 2022/0256643 A1* | 8/2022 | Reial | H04W 72/23 |
| 2022/0322184 A1* | 10/2022 | Niu | H04W 36/0088 |
| 2023/0261717 A1* | 8/2023 | Ma | H04W 72/51 |
| | | | 370/252 |
| 2024/0064858 A1* | 2/2024 | Niu | H04W 68/02 |

FOREIGN PATENT DOCUMENTS

| | | |
|---|---|---|
| CN | 113286333 A | 8/2021 |
| WO | 2021088015 A1 | 5/2021 |
| WO | 2021162609 A1 | 8/2021 |

OTHER PUBLICATIONS

PCT/CN2021/120053, International Search Report and Written Opinion, Jun. 22, 2022, 9 pages.

CATT, "Discussion on Measurement requirements for NTN", R4-2109060, 3GPP TSG-RAN WG4 Meeting #99-e, Electronic Meeting, Agenda Item 9.12.4.4, May 19-27, 2021, 2 pages.

Ericsson, "RRM Measurement requirements for NTN", R4-2110224, 3GPP TSG-RAN WG4 #99-e, Electronic meeting, Agenda Item 9.12.4.4, May 19-27, 2021, 3 pages.

Moderator (Fraunhofer HHI), "Email discussion summary for [99-e][229] NR_NTN_solutions_RRM_1", R4-2108153, 3GPP TSG-RAN WG4 Meeting # 99-e, Electronic Meeting, Agenda item: 9.12.4.1, 9.12.4.2, 9.12.4.4, May 19-27, 2021, 43 pages.

Moderator (Oppo), "FL summary for AI 8.11.1.1—resource allocation for power saving", R1-2101412, 3GPP TSG RAN WG1 #104-e, e-Meeting, Agenda Item 8.11.1.1, Jan. 25-Feb. 5, 2021, 42 pages.

* cited by examiner

| Case ID | Serving cell | Target neighbor cell or target MO | UE behavior issue with DRX |
|---|---|---|---|
| 1 | TN or non-LEO | TN or non-LEO | All DRX cycles as legacy TN could be used for IDLE/Inactive/Connected |
| 2 | TN or non-LEO | LEO | (1) The DRX cycle applicability shall be applied for LEO measurement for IDLE/Inactive/Connected<br>(2) need to check target LEO cell or MO (measurement object) with earth-(quasi)fixed cell and with earth-moving cell |
| 3 | LEO | TN or non-LEO | Serving cell may need to use applicability rule for IDLE/Inactive/Connected |
| 4 | LEO | LEO | (1) The DRX cycle applicability shall be applied for LEO measurement for IDLE/Inactive/Connected, or serving cell shall have implementation limitation<br>(2) need to check target LEO cell or MO with earth-(quasi)fixed cell and with earth-moving cell |

FIG. 3

DRX BASED UE BEHAVIOR

TECHNICAL FIELD

This application relates generally to wireless communication systems, including methods, apparatus, User Equipments and Base Stations for Discontinuous Reception (DRX) cycle configuration and application.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

SUMMARY

Embodiments relate to methods, apparatus, User Equipments and Base Stations for Discontinuous Reception (DRX) cycle configuration and application.

According to the techniques described herein, a DRX cycle threshold, which is a highest value of DRX cycle that can support LEO (Low-Earth Orbit) cell measurement, is introduced. The DRX cycle threshold is associated with all kinds of LEO cells, or is associated with only LEO with earth-moving cells.

For scenarios where at least one of a serving cell and a neighbor cell is a LEO cell, DRX cycle threshold may be used to determine a DRX cycle appropriate for measurement of the at least one LEO cell by a UE of the serving cell.

In some embodiments, based on the DRX cycle threshold, the UE may determine a DRX cycle to be used for measurement of the at least one LEO cell, which may be a serving cell of the UE and/or a neighbor cell.

In some embodiments, based on the DRX cycle threshold, the serving cell may determine a DRX cycle to be sent to the UE, the UE may determine a DRX cycle to be used for measurement of the at least one LEO cell based on the received DRX cycle. In such a case, the UE may not need to determine the DRX cycle to be used for measurement of the at least one LEO cell based on the DRX cycle threshold again.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates a table listing different cases and corresponding UE behavior issues with DRX, according to embodiments disclosed herein.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
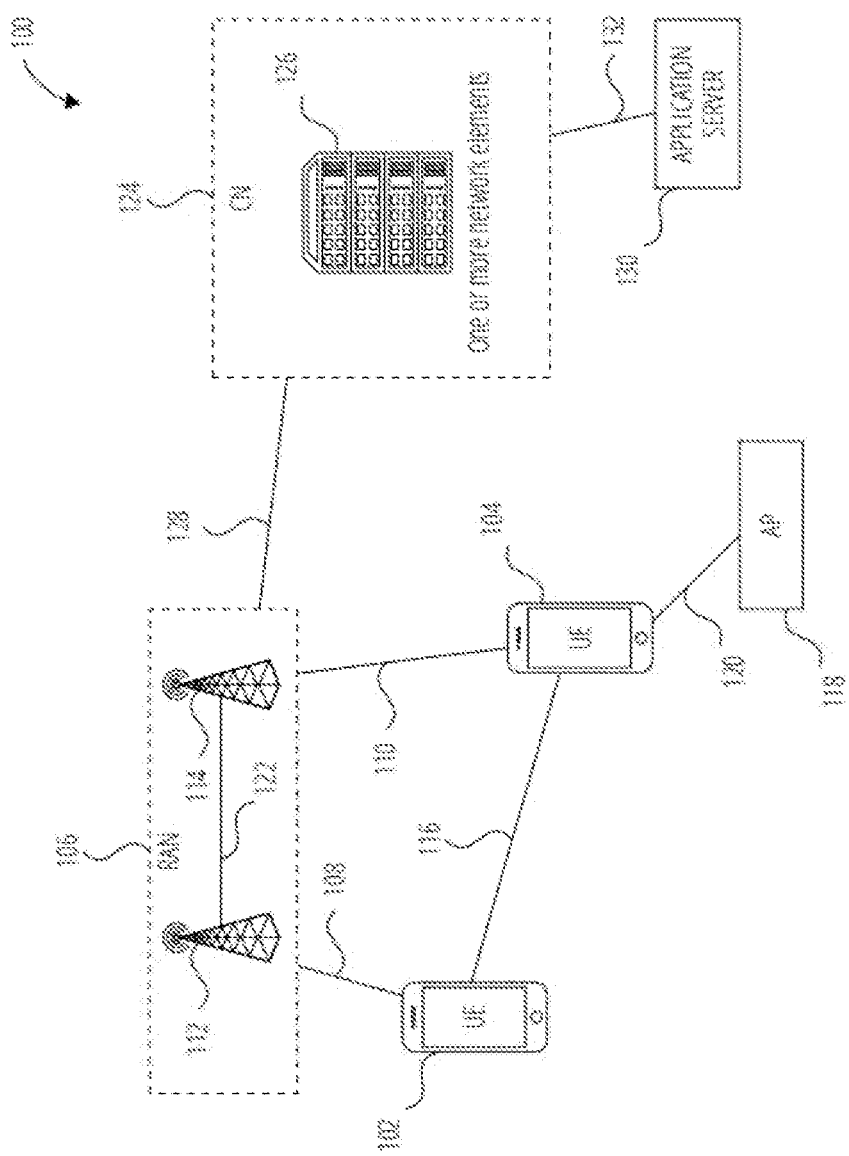
FIG. 1 illustrates an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touch-screen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR. In a case that the RAN 106 is an NTN-based NG-RAN architecture, the connection 108 and connection 110 are NR Uu interfaces.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
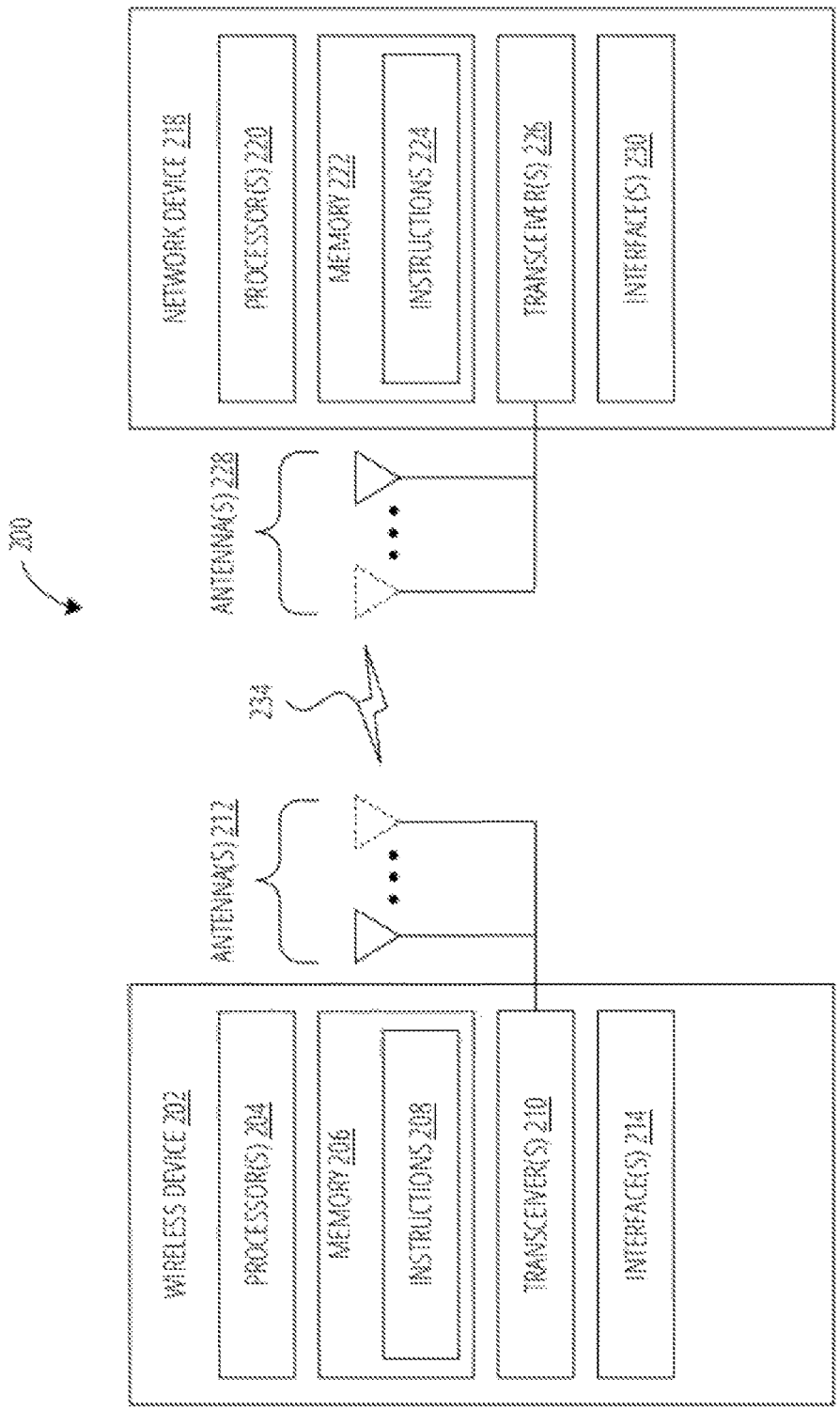
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

Satellites maximize the inherent value of 5G networks by solving coverage problems and providing difficult use-cases that ground-based infrastructure alone cannot address. 5G standards make Non-Terrestrial Networks (NTNs)-including satellite segments—a recognized part of 5G connectivity infrastructure.

NTN is used to deliver 5G/NR service via space (satellite) or air (airborne platform) to those places where it is technically very difficult or cost too much to deliver with a terrestrial network (TN). Some examples of those places would be a remote area like deep forest that would be too costly with terrestrial delivery, or far islands or ships that would be technically almost forbidden in terrestrial connection.

With respect to DRX configuration, different RRC statuses of the UE with the serving cell are considered. In 5G NR, there are three RRC statuses, i.e., RRC Idle, RRC Inactive and RRC connected. No matter the UE is in Idle/Inactive status or Connected status, DRX cycle(s) are configured by the serving cell of the UE.

For Idle/Inactive status, the serving cell sends candidate DRX cycles by broadcasting System Information, the UE reads the candidate DRX cycles from SI and selects a DRX cycle to be applied. The candidate DRX cycles may be a plurality of DRX cycles not larger than a threshold determined by the serving cell.

For Connected status, the serving cell sends a configured DRX cycle to the UE and the UE receives the configured DRX from the serving cell and applies the received DRX cycle.

When considering NTN mobility, there are different types of cells to consider, and in general a cell could be classified as:

Type 1: TN cell. It is a legacy cell.

Type 2: non-Low-Earth Orbit (non-LEO) cell, including Geostationary Earth Orbit (GEO) cell and/or Medium-Earth Orbit (MEO) cell and so on. It has low moving speed or is stationary to target UE.

Type 3: LEO cell. It has very high moving speed, and it can be further categorized into:
(1) LEO with earth-(quasi)fixed cell (means the cell is fixed to UE even though the satellite to cover this cell has been changed from one LEO to another).
(2) LEO with earth-moving cell (means the cell is not fixed to UE; or when LEO satellite is moving away from UE).

It is defined that compared to LEO based earth moving cells scenario where cells are moving on the ground. LEO based earth fixed cells scenario refer to NTN that provides cells fixed with respect to a certain location on the Earth during a certain time duration. This can be achieved with NTN platforms generating steerable beams which footprint is fixed on the ground.

Considering scenarios related with NTN, there are some potential issues. For example, in IDLE/Inactive mode, the candidate DRX cycle is in System Information Block (SIB1) and is mainly designed for paging cycle from the serving cell. If the serving cell is a TN or non-LEO cell but a neighbor cell is a LEO cell for measurement/evaluation, it would be problematic to use a long DRX when measurement is performed on the LEO neighbor cell even though UE could wake up more often during the DRX sleeping time (power consumption issue). In Connected mode, CDRX is configured from the serving cell perspective, and the neighbor cell type also needs to be considered.

FIG. 3 illustrates a table listing different cases and corresponding UE behavior issues with DRX, according to embodiments disclosed herein.

For case 1 in which the serving cell is a TN or non-LEO cell and the target neighbor cell or target Management Object (MO) is also a TN or non-LEO cell, all DRX cycles as legacy TN could be used for IDLE/inactive/Connected. That is, for DLE/Inactive/Connected, all R16 NR candidate DRX cycles can be used for target neighbor cell or MO measurement; there is no applicability restriction at UE, and there is no implementation restriction at NW.

For case 2 in which the serving cell is a TN or non-LEO cell and the target neighbor cell or MO is a LEO cell, the DRX cycle applicability shall be applied for LEO measurement for IDLE/Inactive/Connected, and it is needed to check target LEO cell or MO with earth-(quasi)fixed cell and with earth-moving cell.

For case 3 in which the serving cell is LEO cell and the target neighbor cell or MO is a TN or non-LEO cell, the serving cell may need to use applicability rule for IDLE/inactive/Connected.

For case 4 in which the serving cell is LEO cell and the target neighbor cell or MO is also a LEO cell, the DRX cycle applicability shall be applied for LEO measurement for IDLE/Inactive/Connected, or the serving cell shall have implementation limitation; and it is needed to check target LEO cell or MO with earth-(quasi)fixed cell and with earth moving cell.

For cases 2-4, the embodiments disclosed herein introduce a DRX cycle threshold, wherein the DRX cycle threshold is a highest value of DRX cycle that can support LEO (Low-Earth Orbit) cell measurement. The UE determines and applies a DRX cycle to be used based on the DRX cycle threshold.

Figure 4:
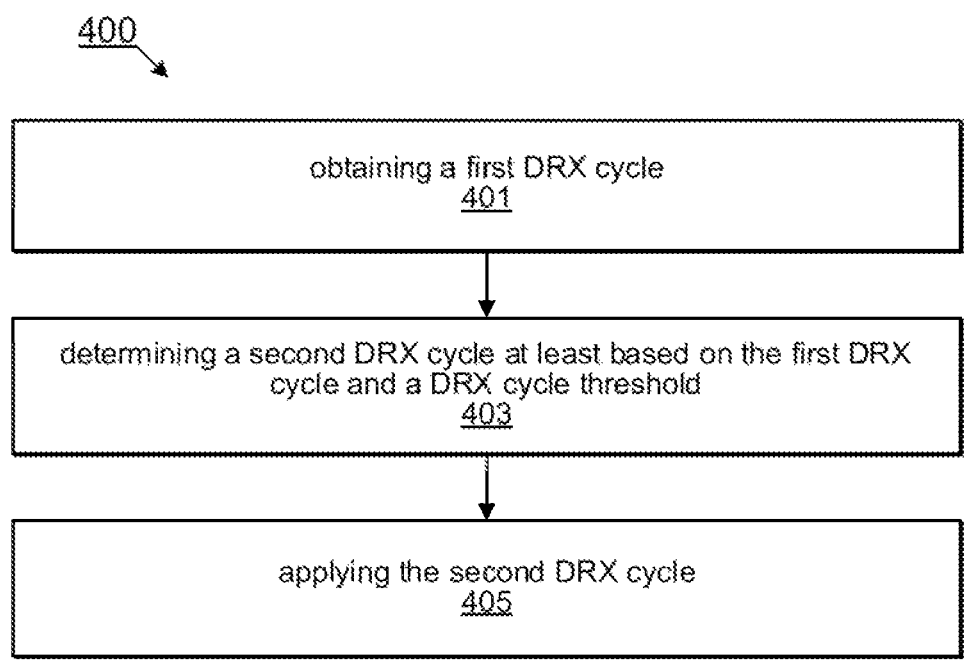
FIG. 4 illustrates a method performed by a UE, according to embodiments disclosed herein.

FIG. 4 illustrates a method 400 performed by a UE, according to embodiments disclosed herein. As shown in FIG. 4, the method 400 comprises step 401, where the UE obtains a first DRX cycle, e.g., denoted as Y. Y may refer to several seconds, slots, semi-slots and so on.

Then, the method 400 further comprises step 403, where the UE determines a second DRX cycle at least based on the first DRX cycle Y and a DRX cycle threshold, e.g., denoted as X. Similar as Y, X may refer to several seconds, slots, semi-slots and so on.

As mentioned above, the DRX cycle threshold may be a highest value of DRX cycle that can support LEO cell measurement. The DRX cycle threshold may be a hard-coded value in spec, or a value configured by the serving cell.

In some embodiments, the DRX cycle threshold may be associated with all kinds of LEO cells, including LEO with earth-(quasi)fixed cells and LEO with earth-moving cell. Though the LEO with earth-(quasi)fixed cells are earth-(quasi)fixed, but the satellite covering the cell is changed from one satellite to another, and affects brought by e.g., the movement of the satellites are considered.

In some embodiments, the DRX cycle threshold may be associated with only LEO with earth-moving cells. The LEO with earth-(quasi)fixed cells are not considered.

The method further comprises step 405, where the UE applies the second DRX cycle, comprising applying the second DRX cycle to measurement of at least one LEO cell of the serving cell and a neighbor cell, wherein at least one of the serving cell and the neighbor cell is a LEO cell.

The invention considers all scenarios that at least one of the serving cell and the neighbor cell is a LEO cell, and the second DRX cycle can be applied to measurement of the LEO cell.

For case 2, the target neighbor cell or target frequency layer in System Information (SI) for measurement is LEO but the serving cell is TN or non-LEO, from the UE perspective, for IDLE/Inactive:
If the candidate DRX cycles in SI has DRX cycle Y and Y>X, UE only applies the DRX with DRX cycle≤X; this application could be based on physical DRX change or based on effective DRX without physical DRX change; and
If the candidate DRX cycles in SI has DRX cycle Y and Y≤X, UE only applies the DRX with DRX cycle≤Y;
The UE shall filter SS-RSRP and SS-RSRQ measurements of each measured target cell using at least 2 measurements. Within the set of measurements used for the filtering, at least two measurements shall be spaced by at least LEO-target-measurement-period/Z, Z could be greater than or equal to 2. LEO-target-measurement-period may be hard-coded in specification or configured by network.

For case 2, the serving cell configured CDRX to UE is Y, and the target neighbor cell or target frequency layer in MO for measurement is LEO, from the UE perspective, for Connected mode:
If Y>X, UE only applies the DRX with DRX cycle≤X; this application could be based on physical DRX change or based on effective DRX without physical DRX change: and
If Y≤X, UE only applies the DRX with DRX cycle=Y.

For case 2, from the network perspective, for Connected mode, if the target neighbor cell or target frequency layer in MO for measurement is LEO, the network would only configure CDRX cycle≤X to the UE.

Figure 5:
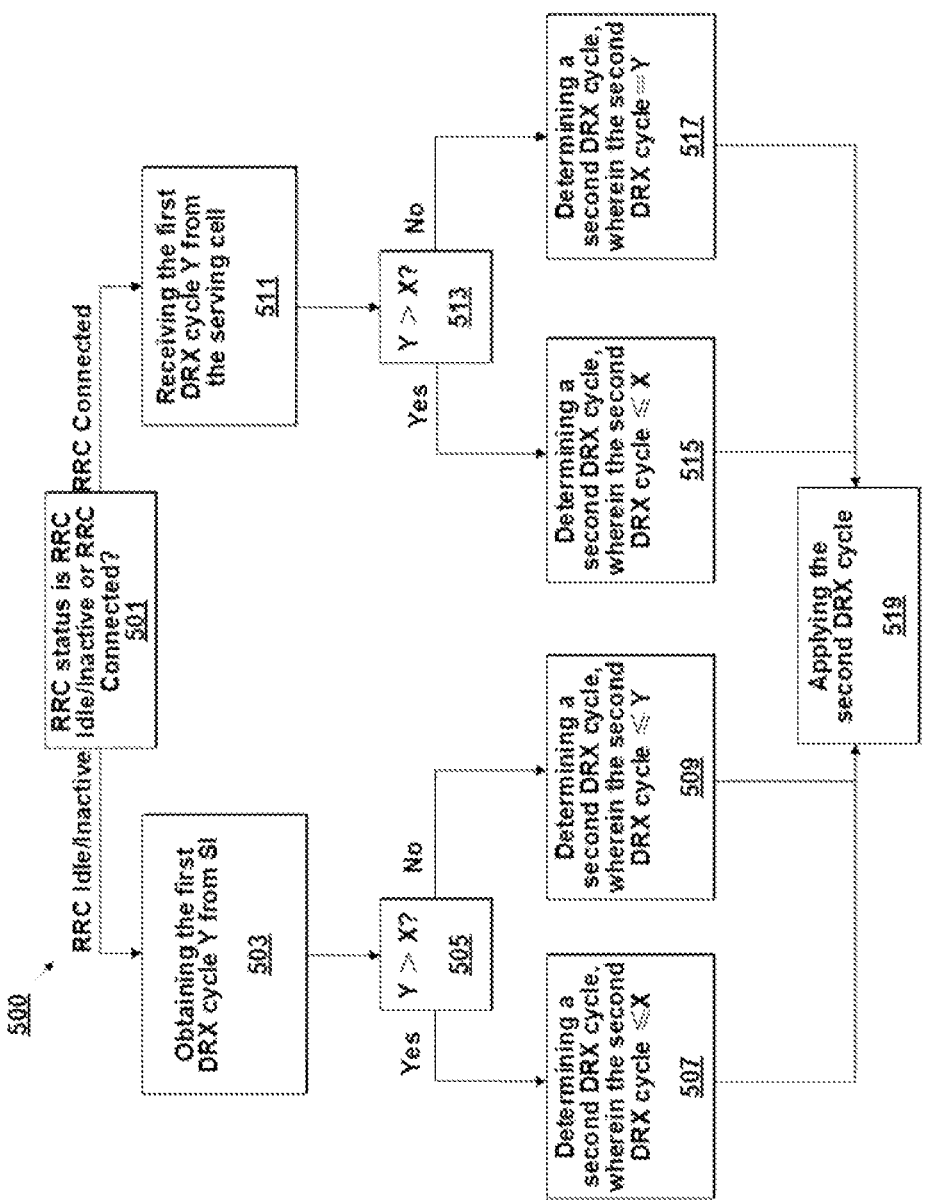
FIG. 5 illustrates a method performed by a UE, according to embodiments disclosed herein.

FIG. 5 illustrates a method 500 performed by a UE, according to embodiments disclosed herein. The method 500 may be performed in case 2, where the serving cell is a NT or non-LEO cell and the target neighbor cell (i.e., the neighbor cell to be measured) is a LEO cell.

As shown in FIG. 5, the method 500 comprises step 501, where the UE determines its RRC status with the serving cell.

If it is determined at step 501 that the RRC status is Idle/Inactive, then the method proceeds to step 503, where the UE obtains a first DRX cycle Y from SI.

In some embodiments, the UE reads a plurality of candidate DRX cycles in System Information from the serving cell and uses a maximum candidate DRX cycle in System Information (SI) as the first DRX cycle Y. For example, SI may comprise a plurality of candidate DRX cycles, e.g., Y1, Y2, Y3 and Y4, wherein Y4 is the largest one. The UE takes Y4 as the first DRX cycle Y.

Then the method may proceed to step 505, where the UE compares the first DRX cycle Y with the DRX cycle threshold X.

As described above, the DRX cycle threshold X may be hard-coded in specification and both the UE and the serving cell know the DRX cycle threshold X. In some other embodiments, the DRX cycle threshold X may be a configured value from the serving cell.

If the first DRX cycle Y is larger than the DRX cycle threshold X, then the method proceeds to step 507, where the UE determines a DRX cycle is equal to or smaller than the DRX cycle threshold X as the second DRX cycle.

For example, the UE may select a DRX cycle that is equal to or smaller than the DRX cycle threshold X from the plurality of candidate DRX cycles in SI, then use the selected DRX cycle as the second DRX cycle.

If the first DRX cycle Y is equal to or smaller than the DRX cycle threshold X, then the method proceeds to step 509, where the UE determines a DRX cycle equal to or smaller than first DRX cycle as the second DRX cycle.

For example, the UE may select a DRX cycle that is equal to or smaller than the first DRX cycle Y from the plurality of candidate DRX cycles in SI, then use the selected DRX cycle as the second DRX cycle.

After determining the second DRX cycle, the method proceeds to step 519, where the UE applies the second DRX cycle as determined.

In RRC Idle/Inactive status, the method may further comprise an operation of filtering each of SS-RSRP and SS-RSRQ measurements of each measured LEO cell (in case 2, i.e., the neighbor cell) using a set of at least two measurements. Within the set of at least two measurements, at least two measurements are spaced by at least LEO-target-measurement-period/Z, Z is an integer greater than or equal to 2.

In other words, for SS-RSRP or SS-RSRQ measurement, at least two samples are used for averaging to determine the final measurement result. At least two samples are spaced by at least LEO-target-measurement-period/Z. For example, if two samples are used, the interval between the two samples shall be equal to or larger than LEO-target-measurement-period/Z.

The LEO-target-measurement-period may be hard-coded in specification or configured by the serving cell.

If it is determined at step 501 that the RRC status is RRC Connected, then the method proceeds to step 511, where the UE receives a first DRX cycle Y from the serving cell. The first DRX cycle Y is configured by the serving cell for the UE.

Then the method may proceed to step 513, where the UE compares the first DRX cycle Y with the DRX cycle threshold X.

If the first DRX cycle Y is larger than the DRX cycle threshold X, then the method proceeds to step 515, where the UE determines a DRX cycle is equal to or smaller than the DRX cycle threshold X as the second DRX cycle.

For example, the UE may select a DRX cycle that is equal to or smaller than the DRX cycle threshold X from a plurality of candidate DRX cycles in SI, then use the selected DRX cycle as the second DRX cycle.

If the first DRX cycle Y is equal to or smaller than the DRX cycle threshold X, then the method proceeds to step 517, where the UE determines a DRX cycle equal to the first DRX cycle Y as the second DRX cycle.

After determining the second DRX cycle, the method proceeds to step 519, where the UE applies the second DRX cycle as determined.

In a case that the first DRX cycle Y is larger than the DRX cycle threshold X, the UE applies the second DRX cycle to measurement of the neighbor cell which is a LEO cell. The application may be implemented based on physical DRX change or based on effective DRX without physical DRX change.

Implementation based on physical DRX change may refer to that the second DRX cycle is physically followed and applied to measurement of the serving cell and measurement of the target neighbor cell.

Implementation based on effective DRX without physical DRX change may refer to that the first DRX cycle is physically followed, but for the measurement of the target neighbor cell, the UE may wake up during OFF duration in the first DRX cycle to measure the target neighbor cell, so as to realize effective DRX with an effective DRX cycle equal to or smaller than the DRX cycle threshold.

In case 2, the UE follows physical DRX cycle when measuring the serving cell. If the physical DRX cycle is the first DRX cycle Y, then the UE applies the first DRX cycle Y for measurement of the serving cell. If the physical DRX cycle is the second DRX cycle, then the UE applies the second DRX cycle for measurement of the serving cell.

For case 3, the serving cell is LEO, for IDLE/Inactive, from NW perspective, the network would only contain candidates of DRX cycle≤X in SI.

For case 3, for IDLE/Inactive, from the UE perspective:
(1) Target cell is a serving cell or an intra-frequency target neighbor cell with TN or non-LEO:
   If the candidate DRX cycles in SI has DRX cycle Y and Y>X, UE only applies the DRX with DRX cycle≤X for serving cell measurement and intra-frequency measurement; this application could be based on physical DRX change or based on effective DRX without physical DRX change;
   If the candidate DRX cycles in SI has DRX cycle Y and Y≤X, UE only applies the DRX with DRX cycle≤Y for serving cell measurement and intra-frequency measurement;
   The UE shall filter the SS-RSRP and SS-RSRQ measurements of the serving cell using at least 2 measurements. Within the set of measurements used for the filtering, at least two measurements shall be spaced by, at least DRX cycle/Z, Z could be greater than or equal to 2.
(2) Target cell is an inter-frequency target neighbor cell with TN or non-LEO:
   UE could apply effective DRX cycle≤Y for inter-frequency measurement if target cells or frequency layers in SI is TN or non-LEO on this inter-frequency.

For case 3, for Connected mode, from NW perspective, if the serving cell is LEO, network would only configure CDRX cycle≤X to UE For case 3, for Connected mode, from the UE perspective:
(1) Target cell is a serving cell or an intra-frequency target neighbor cell with TN or non-LEO:
   If Y>X, UE only applies the DRX with DRX cycle≤X for serving cell and intra-frequency measurement; this application could be based on physical DRX change or based on effective DRX without physical DRX change;
   If Y≤X, UE only applies the DRX with DRX cycle=Y for serving cell and intra-frequency measurement;
(2) Target cell is an inter-frequency target neighbor cell with TN or non-LEO:
   UE could apply effective DRX cycle=Y for inter-frequency measurement on those MOs with TN or non-LEO on this inter-frequency.

Figure 6:
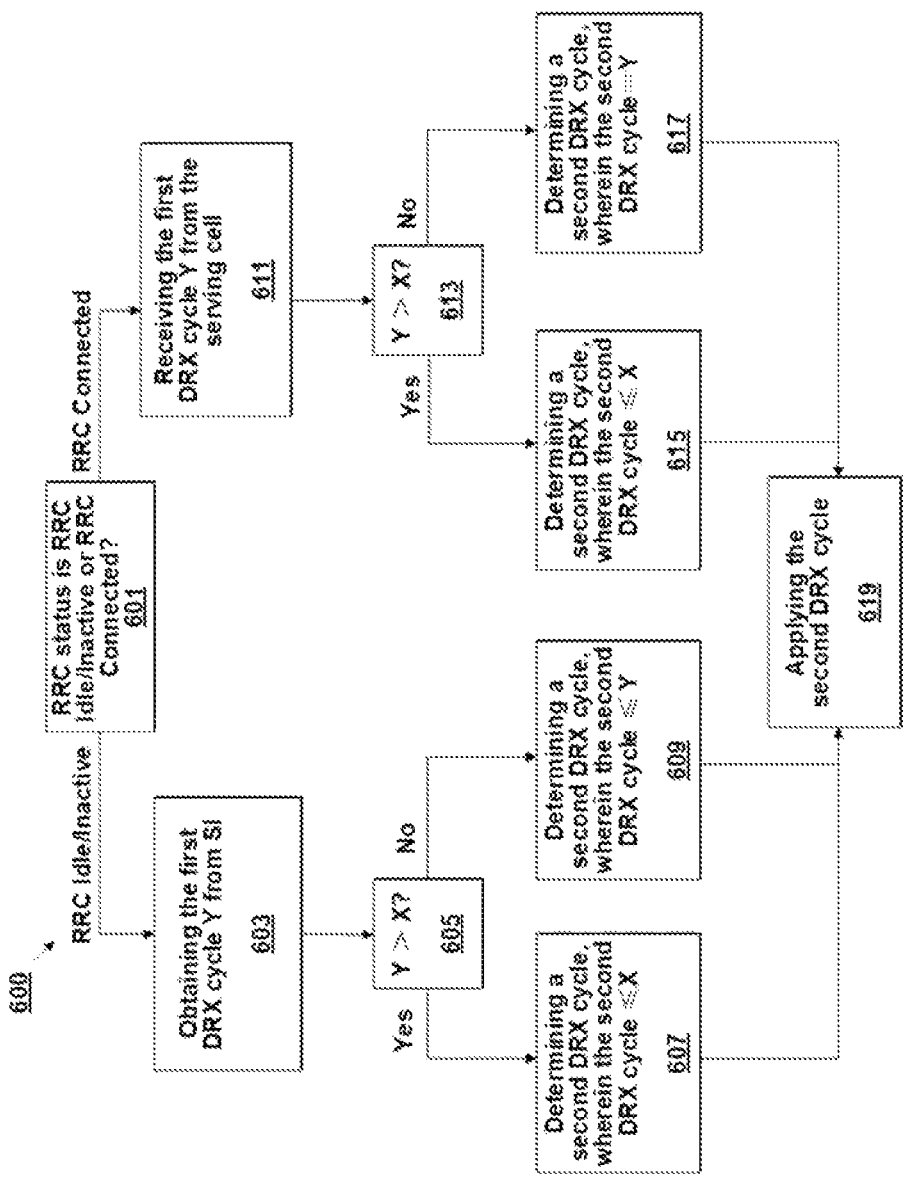
FIG. 6 illustrates a method performed by a UE, according to embodiments disclosed herein.

FIG. 6 illustrates a method 600 performed by a UE, according to embodiments disclosed herein. The method 600 may be performed in case 3, where the serving cell is a LEO cell and the target neighbor cell (i.e., the neighbor cell to be measured) is a TN or non-LEO cell.

As shown in FIG. 6, the method 600 comprises step 601, where the UE determines its RRC status with the serving cell.

If it is determined at step 601 that the RRC status is Idle/Inactive, then the method proceeds to step 603, where the UE obtains a first DRX cycle Y from SI.

Then the method may proceed to step 605, where the UE compares the first DRX cycle Y with the DRX cycle threshold X.

As described above, the DRX cycle threshold X may be hard-coded in specification and both the UE and the serving cell know the DRX cycle threshold X. In some other embodiments, the DRX cycle threshold X may be a configured value from the serving cell.

If the first DRX cycle Y is larger than the DRX cycle threshold X, then the method proceeds to step 607, where the UE determines a DRX cycle is equal to or smaller than the DRX cycle threshold X as the second DRX cycle.

For example, the UE may select a DRX cycle that is equal to or smaller than the DRX cycle threshold X from the plurality of candidate DRX cycles in SI, then use the selected DRX cycle as the second DRX cycle.

If the first DRX cycle Y is equal to or smaller than the DRX cycle threshold X, then the method proceeds to step 609, where the UE determines a DRX cycle equal to or smaller than first DRX cycle as the second DRX cycle.

For example, the UE may select a DRX cycle that is equal to or smaller than the first DRX cycle Y from the plurality of candidate DRX cycles in SI, then use the selected DRX cycle as the second DRX cycle.

After determining the second DRX cycle, the method proceeds to step 619, where the IE applies the second DRX cycle as determined.

In RRC Idle/inactive status, the method may further comprise an operation of filtering each of SS-RSRP and SS-RSRQ measurements of each measured LEO cell (in case 3, i.e., the serving cell) using a set of at least two measurements. Within the set of at least two measurements, at least two measurements are spaced by at least the second DRX cycle/Z, Z is an integer greater than or equal to 2.

In other words, for SS-RSRP or SS-RSRQ measurement, at least two samples are used for averaging to determine the final measurement result. At least two samples are spaced by at least the second DRX cycle/Z.

The LEO-target-measurement-period may be hard-coded in specification or configured by the serving cell.

If it is determined at step 601 that the RRC status is RRC Connected, then the method proceeds to step 611, where the UE receives a first DRX cycle Y from the serving cell. The first DRX cycle Y is configured by the serving cell for the UE.

Then the method may proceed to step 613, where the UE compares the first DRX cycle Y with the DRX cycle threshold X.

If the first DRX cycle Y is larger than the DRX cycle threshold X, then the method proceeds to step 615, where the UE determines a DRX cycle is equal to or smaller than the DRX cycle threshold X as the second DRX cycle.

For example, the UE may select a DRX cycle that is equal to or smaller than the DRX cycle threshold X from a plurality of candidate DRX cycles in SI, then use the selected DRX cycle as the second DRX cycle.

If the first DRX cycle Y is equal to or smaller than the DRX cycle threshold X, then the method proceeds to step 617, where the UE determines a DRX cycle equal to the first DRX cycle Y as the second DRX cycle.

After determining the second DRX cycle, the method proceeds to step 619, where the UE applies the second DRX cycle as determined.

In a case that the first DRX cycle Y is larger than the DRX cycle threshold X, the UE applies the second DRX cycle to measurement of the serving cell which is a LEO cell. The application may be implemented based on physical DRX change or based on effective DRX without physical DRX change.

In case 3, if the neighbor cell, which is a TN or non-LEO cell, is on the same frequency layer with the serving cell, then the UE may apply the second DRX cycle to both measurement of the serving cell and intra-frequency measurement of the neighbor cell.

In case 3, if the neighbor cell, which is a TN or non-LEO cell, is on a different frequency layer from the serving cell, the UE may apply the second DRX cycle to measurement of the serving cell while applying an effective DRX cycle for inter-measurement of the TN cell or the Non-LEO cell. In Idle/Inactive status, the effective DRX cycle is equal to or smaller than the first DRX cycle Y. In Connected status, the effective DRX cycle is equal to the first DRX cycle Y. The effective DRX cycle may be implemented by muting/hopping some ON duration of the physically applied DRX cycle.

For case 4, the serving cell is LEO, for IDLE/Inactive, from NW perspective, the network would only contain candidates of DRX cycle≤X in SI.

For case 4, for IDLE/Inactive, from the UE perspective,
   If the candidate DRX cycles in SI has DRX cycle Y and Y>X, UE only applies the DRX with DRX cycle≤X for serving cell and target neighbor cell/frequency-layer measurement; this application could be based on physical DRX change or based on effective DRX without physical DRX change;
   If the candidate DRX cycles in SI has DRX cycle Y and Y≤X, UE only applies the DRX with DRX cycle≤Y for serving cell and target neighbor cell/frequency-layer measurement;
   The UE shall filter the SS-RSRP and SS-RSRQ measurements of the serving cell and target neighbor cell/frequency-layer measurement using at least 2 measurements. Within the set of measurements used for the filtering, at least two measurements shall be spaced by, at least LEO-target-measurement-period/Z, Z could be greater than or equal to 2.

LEO-target-measurement-period is hard-coded in specification or configured by network, e.g., if target cell is serving cell or on the serving cell frequency layer, then LEO-target-measurement-period=DRX cycle.

For case 4, for Connected mode, from NW perspective, if the serving cell is LEO, the network would only configure CDRX cycle≤X to UE.

For case 4, for Connected mode, from UE perspective, if the serving cell configured CDRX to UE is Y,
  If Y>X, UE only applies the DRX with DRX cycle≤X for serving cell and target neighbor cell (with LEO) measurement; this application could be based on physical DRX change or based on effective DRX without physical DRX change
  if Y≤X, UE only applies the DRX with DRX cycle=Y for serving cell and target neighbor cell (with LEO) measurement.

Figure 7:
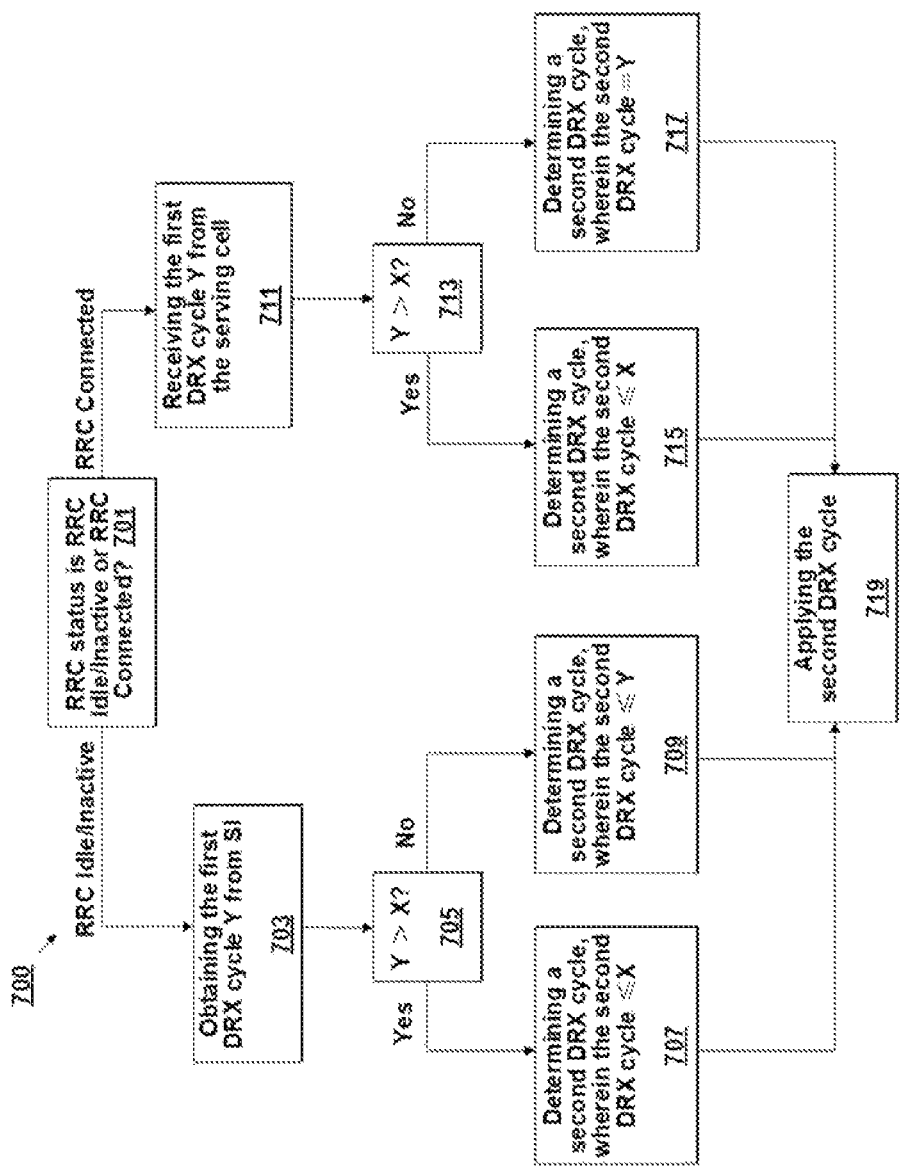
FIG. 7 illustrates a method performed by a UE, according to embodiments disclosed herein.

FIG. 7 illustrates a method 700 performed by a UE, according to embodiments disclosed herein. The method 700 may be performed in case 4, where both the serving cell and the target neighbor cell (i.e., the neighbor cell to be measured) are LEO cells.

As shown in FIG. 7, the method 700 comprises step 701, where the UE determines its RRC status with the serving cell.

If it is determined at step 701 that the RRC status is Idle/Inactive, then the method proceeds to step 703, where the UE obtains a first DRX cycle Y from SI.

Then the method may proceed to step 705, where the UE compares the first DRX cycle Y with the DRX cycle threshold X.

As described above, the DRX cycle threshold X may be hard-coded in specification and both the UE and the serving cell know the DRX cycle threshold X. In some other embodiments, the DRX cycle threshold X may be a configured value from the serving cell.

If the first DRX cycle Y is larger than the DRX cycle threshold X, then the method proceeds to step 707, where the UE determines a DRX cycle is equal to or smaller than the DRX cycle threshold X as the second DRX cycle.

For example, the UE may select a DRX cycle that is equal to or smaller than the DRX cycle threshold X from the plurality of candidate DRX cycles in SI, then use the selected DRX cycle as the second DRX cycle.

If the first DRX cycle Y is equal to or smaller than the DRX cycle threshold X, then the method proceeds to step 709, where the UE determines a DRX cycle equal to or smaller than first DRX cycle as the second DRX cycle.

For example, the UE may select a DRX cycle that is equal to or smaller than the first DRX cycle Y from the plurality of candidate DRX cycles in SI, then use the selected DRX cycle as the second DRX cycle.

After determining the second DRX cycle, the method proceeds to step 719, where the UE applies the second DRX cycle as determined.

In RRC Idle/Inactive status, the method may further comprise an operation of filtering each of SS-RSRP and SS-RSRQ measurements of each measured LEO cell (in case 4, i.e., the serving cell and the neighbor cell) using a set of at least two measurements. Within the set of at least two measurements, at least two measurements are spaced by at least LEO-target-measurement-period/Z, Z is an integer greater than or equal to 2.

In other words, for SS-RSRP or SS-RSRQ measurement, at least two samples are used for averaging to determine the final measurement result. At least two samples are spaced by at least the second DRX cycle/Z.

The LEO-target-measurement-period may be hard-coded in specification or configured by the serving cell. In case 4, if the target cell the UE is to measure is the serving cell or on the serving cell frequency layer, then the LEO-target-measurement-period may be equal to the second DRX cycle.

If it is determined at step 701 that the RRC status is RRC Connected, then the method proceeds to step 711, where the UE receives a first DRX cycle Y from the serving cell. The first DRX cycle Y is configured by the serving cell for the UE.

Then the method may proceed to step 713, where the UE compares the first DRX cycle Y with the DRX cycle threshold X.

If the first DRX cycle Y is larger than the DRX cycle threshold X, then the method proceeds to step 715, where the UE determines a DRX cycle is equal to or smaller than the DRX cycle threshold X as the second DRX cycle.

For example, the UE may select a DRX cycle that is equal to or smaller than the DRX cycle threshold X from a plurality of candidate DRX cycles in SI, then use the selected DRX cycle as the second DRX cycle.

If the first DRX cycle Y is equal to or smaller than the DRX cycle threshold X, then the method proceeds to step 717, where the UE determines a DRX cycle equal to the first DRX cycle Y as the second DRX cycle.

After determining the second DRX cycle, the method proceeds to step 719, where the UE applies the second DRX cycle as determined.

In case 4, the UE may apply the second DRX cycle to both measurement of the serving cell and measurement of the neighbor cell.

The methods 500-700 are described based on the assumption that the UE is not sure whether the first DRX cycle the network sent to the UE is equal to or smaller than the DRX cycle threshold.

Embodiments contemplated herein include an apparatus comprising means to perform one or more elements of the method 400-700. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of the method 400-700. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method 400-700. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the method 400-700. This apparatus may be, for example, an apparatus of a UE (such as a wireless device 202 that is a UE, as described herein).

Embodiments contemplated herein include a signal as described in or related to one or more elements of the method 400-700.

Embodiments contemplated herein include a computer program or computer program product comprising instructions, wherein execution of the program by a processor is to cause the processor to carry out one or more elements of the method 400-700. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

In some embodiments, the network has configured the first DRX cycle not exceeding the DRX cycle threshold. The network may indicate this to the UE. In such a case, if RRC status of the UE with the serving cell is RRC Idle/Inactive, the UE may determine a DRX cycle equal to or smaller than the first DRX cycle as the second DRX cycle: and if RRC status of the UE with the serving cell is RRC Connected, the UE may determine a DRX cycle equal to the first DRX cycle as the second DRX cycle.

Figure 8:
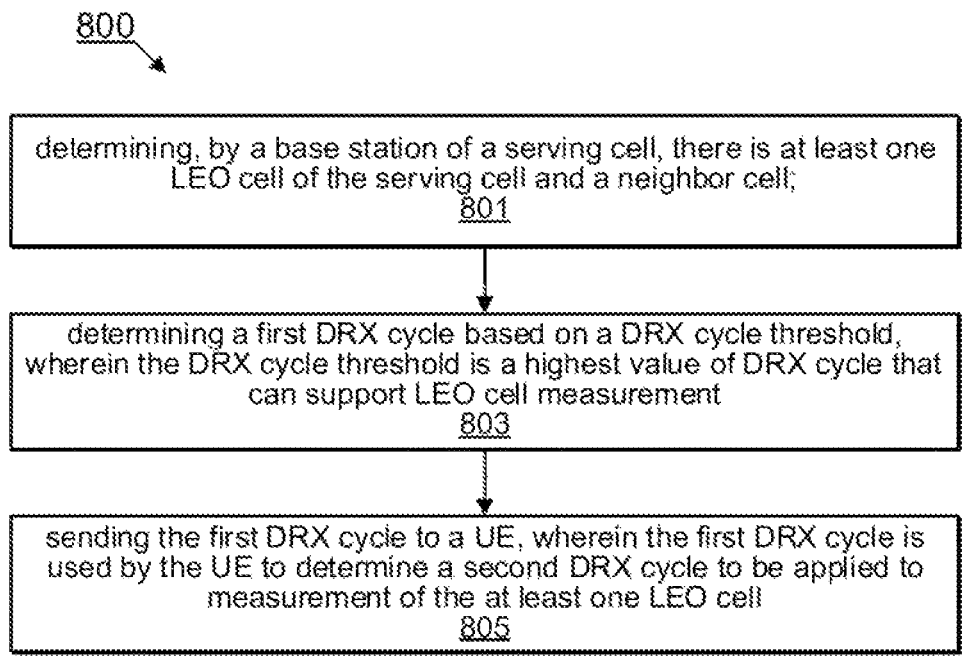
FIG. 8 illustrates a method performed by a base station, according to embodiments disclosed herein.

FIG. 8 illustrates a method 800 performed by a base station, according to embodiments disclosed herein. The method 800 may comprise step 801, where the base station determines there is at least one LEO cell of the serving cell and a neighbor cell. The method may further comprise step 803, where the base station determines a first DRX cycle based on a DRX cycle threshold, wherein the DRX cycle threshold is a highest value of DRX cycle that can support LEO cell measurement. The method may further comprise step 805, where the base station sends the first DRX cycle to a UE, wherein the first DRX cycle is used by the UE to determine a second DRX cycle to be applied to measurement of the at least one LEO cell.

Embodiments contemplated herein include an apparatus comprising means to perform one or more elements of the method 800. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of the method 800. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a base station (such as a network device 218 that is a base station, as described herein).

Embodiments contemplated herein include a signal as described in or related to one or more elements of the method 800.

Embodiments contemplated herein include a computer program or computer program product comprising instructions, wherein execution of the program by a processing element is to cause the processing element to carry out one or more elements of the method 800. The processor may be a processor of a base station (such as a processor(s) 220 of a network device 218 that is abase station, as described herein). These instructions may be, for example, located in the processor and/or on a memory of the UE (such as a memory 222 of a network device 218 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The disclosure herein includes at least the following items.

Item 1. A user equipment (UE), comprising:
at least one antenna;
at least one radio coupled to the at least one antenna; and
a processor coupled to the at least one radio;
wherein the UE is configured to perform operations comprising:
obtaining a first DRX (Discontinuous Reception) cycle;
determining a second DRX cycle at least based on the first DRX cycle and a DRX cycle threshold, wherein the DRX cycle threshold is a highest value of DRX cycle that can support LEO (Low-Earth Orbit) cell measurement; and
applying the second DRX cycle, comprising applying the second DRX cycle to measurement of at least one LEO cell of the serving cell and a neighbor cell, wherein at least one of the serving cell and the neighbor cell is a LEO cell.

Item 2. The UE of Item 1, wherein:
the DRX cycle threshold is a hard-coded value in specification, or
the DRX cycle threshold is a value configured by the serving cell.

Item 3. The UE of item 1, wherein:
the DRX cycle threshold is associated with all kinds of LEO cells; or
the DRX cycle threshold is associated with only LEO with earth-moving cells.

Item 4. The UE of Item 1, wherein RRC status of the UE with the serving cell is RRC Idle/Inactive, the determining the second DRX cycle further comprises:
comparing the first DRX cycle to the DRX cycle threshold;
if the first DRX cycle is larger than the DRX cycle threshold, determining a DRX cycle is equal to or smaller than the DRX cycle threshold as the second DRX cycle; and
if the first DRX cycle is equal to or smaller than the DRX cycle threshold, determining a DRX cycle equal to or smaller than first DRX cycle as the second DRX cycle.

Item 5. The UE of Item 4, wherein in a case that the first DRX cycle is larger than the DRX cycle threshold, the applying the second DRX cycle to measurement of the at least one LEO cell is implemented based on physical DRX change or based on effective DRX without physical DRX change.

Item 6. The UE of Item 4, wherein the serving cell is a terrestrial network (TN) cell or a non-LEO cell and the neighbor cell is a LEO cell, the operations further comprise:
filtering each of SS-RSRP and SS-RSRQ measurements of each measured LEO cell using a set of at least two measurements, within the set of at least two measurements, at least two measurements are spaced by at least LEO-target-measurement-period/Z, Z is an integer greater than or equal to 2.

Item 7. The UE of Item 6, wherein the LEO-target-measurement-period is hard-coded in specification or configured by the serving cell.

Item 8. The UE of Item 4, wherein the serving cell is a LEO cell and the neighbor cell is a TN cell or a non-LEO cell on an intra-frequency layer with the serving cell, the applying the second DRX cycle further comprises: applying the second DRX cycle to measurement of the serving cell and intra-frequency measurement of the TN cell or the non-LEO cell.

Item 9. The UE of Item 8, wherein the operations further comprise:
filtering each of SS-RSRP and SS-RSRQ measurements of each measured LEO cell using a set of at least two measurements, within the set of at least two measurements, at least two measurements are spaced by at least the second DRX cycle/Z, Z could be greater than or equal to 2.

Item 10. The UE of Item 4, wherein the serving cell is a LEO cell and the neighbor cell is a TN cell or a non-LEO cell on an inter-frequency layer with the serving cell, the operations further comprise:
applying an effective DRX cycle for inter-measurement of the TN cell or the non-LEO cell,
wherein the effective DRX cycle is equal to or smaller than the first DRX cycle.

Item 11. The UE of Item 4, wherein both the serving cell and the neighbor cell are LEO cells, the applying the second DRX cycle further comprises: applying the second DRX cycle to measurement of the serving cell and measurement of the neighbor cell.

Item 12. The UE of Item 11, the operations further comprise:
filtering each of SS-RSRP and SS-RSRQ measurements of each measured LEO cell using a set of at least two measurements, within the set of at least two measurements, at least two measurements are spaced by at least LEO-target-measurement-period/Z. Z is an integer greater than or equal to 2.

Item 13. The UE of Item 12, wherein the LEO-target-measurement-period is hard-coded in specification or configured by the serving cell.

Item 14. The UE of Item 12, wherein if the measured cell is the serving cell or the neighbor cell on frequency layer of the serving cell, the LEO-target-measurement-period equals to the second DRX cycle.

Item 15. The UE of Item 4, wherein the obtaining the first DRX cycle further comprises: using a maximum candidate DRX cycle in System Information (SI) as the first DRX cycle.

Item 16. The UE of Item 1, wherein RRC status of the UE with the serving cell is RRC Connected, the determining the second DRX cycle further comprises:
comparing the first DRX cycle to the DRX cycle threshold;
if the first DRX cycle is larger than the DRX cycle threshold, determining a DRX cycle is equal to or smaller than the DRX cycle threshold as the second DRX cycle; and
if the first DRX cycle is equal to or smaller than the DRX cycle threshold, determining a DRX cycle equal to first DRX cycle as the second DRX cycle.

Item 17. The UE of Item 16, wherein in a case that the first DRX cycle is larger than the DRX cycle threshold, the applying the second DRX cycle to measurement of the at least one LEO cell is implemented based on physical DRX change or based on effective DRX without physical DRX change.

Item 18. The UE of item 16, wherein the serving cell is a TN cell or a non-LEO cell and the neighbor cell is a LEO cell, the applying the second DRX cycle further comprises: applying the second DRX cycle to measurement of the neighbor cell.

Item 19. The UE of Item 16, wherein the serving cell is a LEO cell and the neighbor cell is a TN cell or a non-LEO cell on an intra-frequency layer with the serving cell, the operations further comprise:

applying the second DRX cycle to measurement of the serving cell and intra-frequency measurement of the TN cell or the non-LEO cell.

Item 20. The UE of Item 16, wherein the serving cell is a LEO cell and the neighbor cell is a TN cell or a non-LEO cell on an inter-frequency layer with the serving cell, the method further comprises:
applying an effective DRX cycle for inter-measurement of the TN cell or the non-LEO cell, wherein the effective DRX cycle is equal to the first DRX cycle.

Item 21. The UE of item 16, wherein both the serving cell and the neighbor cell are LEO cells, the applying the second DRX cycle further comprises:
applying the second DRX cycle to measurement of the serving cell and measurement of the neighbor cell.

Item 22. The UE of Item 16, wherein the UE obtains from the serving cell the first DRX cycle configured by the serving cell.

Item 23. The UE of Item 1, wherein the first DRX cycle was determined by the serving cell based on the DRX cycle threshold.

Item 24. The UE of Item 23, wherein RRC status of the UE with the serving cell is RRC Idle/Inactive, the determining the second DRX cycle further comprises: determining a DRX cycle equal to or smaller than first DRX cycle as the second DRX cycle.

Item 25. The UE of Item 23, wherein RRC status of the UE with the serving cell is RRC Connected, the determining the second DRX cycle further comprises: determining the first DRX cycle as the second DRX cycle.

Item 26. A method, comprising:
obtaining, by a user equipment (UE), a first DRX (Discontinuous Reception) cycle;
determining a second DRX cycle at least based on the first DRX cycle and a DRX cycle threshold, wherein the DRX cycle threshold is a highest value of DRX cycle that can support LEO (Low-Earth Orbit) cell measurement; and
applying the second DRX cycle, comprising applying the second DRX cycle to measurement of at least one LEO cell of the serving cell and a neighbor cell, wherein at least one of the serving cell and the neighbor cell is a LEO cell.

Item 27. The method of Item 26, wherein:
the DRX cycle threshold is a hard-coded value in specification, or
the DRX cycle threshold is a value configured by the serving cell.

Item 28. The method of Item 26, wherein:
the DRX cycle threshold is associated with all kinds of LEO cells; or
the DRX cycle threshold is associated with only LEO with earth-moving cells.

Item 29. The method of Item 26, wherein, if RRC status of the UE with the serving cell is RRC Idle/inactive, the determining the second DRX cycle further comprises:
comparing the first DRX cycle to the DRX cycle threshold;
if the first DRX cycle is larger than the DRX cycle threshold, determining a DRX cycle is equal to or smaller than the DRX cycle threshold as the second DRX cycle; and
if the first DRX cycle is equal to or smaller than the DRX cycle threshold, determining a DRX cycle equal to or smaller than first DRX cycle as the second DRX cycle.

Item 30. The method of Item 29, wherein in a case that the first DRX cycle is larger than the DRX cycle threshold, applying the second DRX cycle to measurement of the at least one LEO cell is implemented based on physical DRX change or based on effective DRX without physical DRX change.

Item 31. The method of Item 29, wherein the serving cell is a terrestrial network (TN) cell or a non-LEO cell and the neighbor cell is a LEO cell, the applying the second DRX cycle further comprising applying the second DRX cycle to measurement of the serving cell and measurement of the neighbor cell, the method further comprises:
filtering each of SS-RSRP and SS-RSRQ measurements of each measured LEO cell using a set of at least two measurements, within the set of at least two measurements, at least two measurements are spaced by at least LEO-target-measurement-period/Z. Z is an integer greater than or equal to 2.

Item 32. The method of item 31, wherein, the LEO-target-measurement-period is hard-coded in specification or configured by the serving cell.

Item 33. The method of Item 29, wherein the serving cell is a LEO cell and the neighbor cell is a TN cell or a non-LEO cell on an intra-frequency layer with the serving cell, the applying the second DRX cycle further comprises:
applying the second DRX cycle to measurement of the serving cell and intra-frequency measurement of the TN cell or the non-LEO cell.

Item 34. The method of Item 33, further comprising: filtering each of SS-RSRP and SS-RSRQ measurements of each measured LEO cell using a set of at least two measurements, within the set of at least two measurements, at least two measurements are spaced by at least the second DRX cycle/Z, Z could be greater than or equal to 2.

Item 35. The method of Item 29, wherein the serving cell is a LEO cell and the neighbor cell is a TN cell or a non-LEO cell on an inter-frequency layer with the serving cell, the method further comprises:
applying an effective DRX cycle for inter-measurement of the TN cell or the non-LEO cell, wherein the effective DRX cycle is equal to or smaller than the first DRX cycle.

Item 36. The method of Item 29, wherein both the serving cell and the neighbor cell are LEO cells, the applying the second DRX cycle further comprises:
applying the second DRX cycle to measurement of the serving cell and measurement of the neighbor cell.

Item 37. The method of Item 36, the method further comprises:
filtering each of SS-RSRP and SS-RSRQ measurements of each measured LEO cell using a set of at least two measurements, within the set of at least two measurements, at least two measurements are spaced by at least LEO-target-measurement-period/Z, Z is an integer greater than or equal to 2.

Item 38. The method of Item 37, wherein the LEO-target-measurement-period is hard-coded in specification or configured by the serving cell.

Item 39. The method of Item 37, wherein if the measured cell is the serving cell or the neighbor cell on frequency layer of the serving cell, the LEO-target-measurement-period equals to the second DRX cycle.

Item 40. The method of Item 29, wherein the obtaining, by the UE, the first DRX cycle further comprises:
using a maximum candidate DRX cycle in System Information (SI) as the first DRX cycle.

Item 41. The method of Item 26, wherein, if RRC status of the UE with the serving cell is RRC Connected, the determining the second DRX cycle further comprises:

comparing the first DRX cycle to the DRX cycle threshold;
if the first DRX cycle is larger than the DRX cycle threshold, determining a DRX cycle is equal to or smaller than the DRX cycle threshold as the second DRX cycle; and
if the first DRX cycle is equal to or smaller than the DRX cycle threshold, determining a DRX cycle equal to first DRX cycle as the second DRX cycle.

Item 42. The method of Item 41, wherein in a case that the first DRX cycle is larger than the DRX cycle threshold, the applying the second DRX cycle to measurement of the at least one LEO cell is implemented based on physical DRX change or based on effective DRX without physical DRX change.

Item 43. The method of item 41, wherein the serving cell is a TN cell or a non-LEO cell and the neighbor cell is a LEO cell, the applying the second DRX cycle further comprises:
applying the second DRX cycle to measurement of the neighbor cell.

Item 44. The method of Item 41, wherein the serving cell is a LEO cell and the neighbor cell is a TN cell or a non-LEO cell on an intra-frequency layer with the serving cell, the method further comprises:
applying the second DRX cycle to measurement of the serving cell and intra-frequency measurement of the TN cell or the non-LEO cell.

Item 45. The method of item 38, wherein the serving cell is a LEO cell and the neighbor cell is a TN cell or a non-LEO cell on an inter-frequency layer with the serving cell, the method further comprises:
applying an effective DRX cycle for inter-measurement of the TN cell or the non-LEO cell, wherein the effective DRX cycle is equal to the first DRX cycle.

Item 46. The method of Item 41, wherein both the serving cell and the neighbor cell are LEO cells, the applying the second DRX cycle further comprises: applying the second DRX cycle to measurement of the serving cell and measurement of the neighbor cell.

Item 47. The method of Item 38, wherein the UE obtains from the serving cell the first DRX cycle configured by the serving cell.

Item 48. The method of Item 1, wherein the first DRX cycle was determined by the serving cell based on the DRX cycle threshold.

Item 49. The method of Item 48, wherein RRC status of the UE with the serving cell is RRC Idle/Inactive, the determining the second DRX cycle further comprises: determining a DRX cycle equal to or smaller than first DRX cycle as the second DRX cycle.

Item 50. The method of Item 49, wherein RRC status of the UE with the serving cell is RRC Connected, the determining the second DRX cycle further comprises: determining a DRX cycle equal to the first DRX cycle as the second DRX cycle.

Item 51. An apparatus for operating a user equipment (UE), comprising:
a processor configured to cause the UE to perform a method of any of claims 26-50.

Item 52. A non-transitory computer-readable memory medium storing program instructions which, when executed at a user equipment (UE), cause the UE to perform a method of any of claims 26-50.

Item 53. A computer program product, comprising program instructions which, when executed at a user equipment (UE), cause the UE to perform a method of any of claims 26-50.

Item 54. A base station (BS), comprising:
at least one antenna;
at least one radio coupled to the at least one antenna; and
a processor coupled to the at least one radio;
wherein the BS is configured to perform operations comprising:
determining there is at least one LEO cell of a serving cell provided by the BS and a neighbor cell;
determining a first DRX cycle based on a DRX cycle threshold, wherein the DRX cycle threshold is a highest value of DRX cycle that can support LEO cell measurement; and
sending the first DRX cycle to a UE, wherein the first DRX cycle is used by the UE to determine a second DRX cycle to be applied to measurement of the at least one LEO cell.

Item 55. The BS of Item 54, wherein:
the DRX cycle threshold is a hard-coded value in specification, or
the DRX cycle threshold is a value configured by the serving cell.

Item 56. The BS of Item 54, wherein:
the DRX cycle threshold is associated with all kinds of LEO cells; or
the DRX cycle threshold is associated with only LEO with earth-moving cells.

Item 57. A method, comprising:
determining, by a base station of a serving cell, there is at least one LEO cell of the serving cell and a neighbor cell;
determining a first DRX cycle based on a DRX cycle threshold, wherein the DRX cycle threshold is a highest value of DRX cycle that can support LEO cell measurement; and
sending the first DRX cycle to a user equipment (UE), wherein the first DRX cycle is used by the UE to determine a second DRX cycle to be applied to measurement of the at least one LEO cell.

Item 58. The method of Item 57, wherein:
the DRX cycle threshold is a hard-coded value in specification, or
the DRX cycle threshold is a value configured by the serving cell.

Item 59. The method of Item 58, wherein:
the DRX cycle threshold is associated with all kinds of LEO cells; or
the DRX cycle threshold is associated with only LEO with earth-moving cells.

Item 60. An apparatus for operating a base station (BS), comprising:
a processor configured to cause the UE to perform a method of any of claims 57-59.

Item 61. A non-transitory computer-readable memory medium storing program instructions which, when executed at a base station (BS), cause the BS to perform a method of any of claims 57-59.

Item 62. A computer program product, comprising program instructions which, when executed at a base station (BS), cause the BS to perform a method of any of claims 57-59.

The invention claimed is:

1. A user equipment (UE), comprising:
at least one antenna;
at least one radio coupled to the at least one antenna; and
a processor coupled to the at least one radio;
wherein the UE is configured to perform operations comprising:

obtaining a first DRX (Discontinuous Reception) cycle;
determining a second DRX cycle at least based on the first DRX cycle and a DRX cycle threshold, wherein the DRX cycle threshold is a highest value of DRX cycle that supports LEO (Low-Earth Orbit) cell measurement, and wherein when a Radio Resource Control (RRC) status of the UE with a serving cell is RRC Idle/Inactive, the determining the second DRX cycle further comprises:
  comparing the first DRX cycle to the DRX cycle threshold;
  if the first DRX cycle is larger than the DRX cycle threshold, selecting the second DRX cycle as equal to or smaller than the DRX cycle threshold; and
  if the first DRX cycle is equal to or smaller than the DRX cycle threshold, selecting the second DRX cycle as equal to or smaller than the first DRX cycle; and
applying the second DRX cycle to measurement of at least one LEO cell of the serving cell and a neighbor cell, wherein at least one of the serving cell and the neighbor cell is a LEO cell.

2. The UE of claim 1, wherein:
the DRX cycle threshold is a hard-coded value in specification, or
the DRX cycle threshold is a value configured by the serving cell.

3. The UE of claim 1, wherein:
the DRX cycle threshold is associated with all kinds of LEO cells; or
the DRX cycle threshold is associated with only LEO with earth-moving cells.

4. The UE of claim 1, wherein in a case that the first DRX cycle is larger than the DRX cycle threshold, the applying the second DRX cycle to measurement of the at least one LEO cell is implemented based on physical DRX change or based on effective DRX without physical DRX change.

5. The UE of claim 1, wherein the serving cell is a terrestrial network (TN) cell or a non-LEO cell and the neighbor cell is a LEO cell, the operations further comprise:
filtering each of SS-RSRP and SS-RSRQ measurements of each measured LEO cell using a set of at least two measurements, within the set of at least two measurements, at least two measurements are spaced by at least LEO-target-measurement-period/Z, Z is an integer greater than or equal to 2.

6. The UE of claim 1, wherein the serving cell is a LEO cell and the neighbor cell is a TN cell or a non-LEO cell on an intra-frequency layer with the serving cell, the applying the second DRX cycle further comprises:
applying the second DRX cycle to measurement of the serving cell and intra-frequency measurement of the TN cell or the non-LEO cell; and
the operations further comprise:
  filtering each of SS-RSRP and SS-RSRQ measurements of each measured LEO cell using a set of at least two measurements, within the set of at least two measurements, at least two measurements are spaced by at least the second DRX cycle/Z, Z could be greater than or equal to 2.

7. The UE of claim 1, wherein the serving cell is a LEO cell and the neighbor cell is a TN cell or a non-LEO cell on an inter-frequency layer with the serving cell, the operations further comprise:

applying an effective DRX cycle for inter-measurement of the TN cell or the non-LEO cell, wherein the effective DRX cycle is equal to or smaller than the first DRX cycle.

8. The UE of claim 1, wherein both the serving cell and the neighbor cell are LEO cells, the applying the second DRX cycle further comprises:
applying the second DRX cycle to measurement of the serving cell and measurement of the neighbor cell;
the operations further comprise:
  filtering each of SS-RSRP and SS-RSRQ measurements of each measured LEO cell using a set of at least two measurements, within the set of at least two measurements, at least two measurements are spaced by at least LEO-target-measurement-period/Z, Z is an integer greater than or equal to 2.

9. The UE of claim 8, wherein if the measured cell is the serving cell or the neighbor cell on frequency layer of the serving cell, the LEO-target-measurement-period equals to the second DRX cycle.

10. The UE of claim 1, wherein when the RRC status of the UE with the serving cell is RRC Connected, the determining the second DRX cycle further comprises:
  comparing the first DRX cycle to the DRX cycle threshold;
  if the first DRX cycle is larger than the DRX cycle threshold, selecting the second DRX cycle as equal to or smaller than the DRX cycle threshold; and
  if the first DRX cycle is equal to or smaller than the DRX cycle threshold, selecting the second DRX cycle as equal to first DRX cycle.

11. The UE of claim 10, wherein if the first DRX cycle is larger than the DRX cycle threshold, the applying the second DRX cycle to measurement of the at least one LEO cell is implemented based on physical DRX change or based on effective DRX without physical DRX change.

12. The UE of claim 10, wherein:
in case that the serving cell is a TN cell or a non-LEO cell and the neighbor cell is a LEO cell, the applying the second DRX cycle further comprises: applying the second DRX cycle to measurement of the neighbor cell;
in case that the serving cell is a LEO cell and the neighbor cell is a TN cell or a non-LEO cell on an intra-frequency layer with the serving cell, the operations further comprise: applying the second DRX cycle to measurement of the serving cell and intra-frequency measurement of the TN cell or the non-LEO cell;
in case that the serving cell is a LEO cell and the neighbor cell is a TN cell or a non-LEO cell on an inter-frequency layer with the serving cell, the operations further comprise: applying an effective DRX cycle for inter-measurement of the TN cell or the non-LEO cell, wherein the effective DRX cycle is equal to the first DRX cycle; and
in case that both the serving cell and the neighbor cell are LEO cells, the applying the second DRX cycle further comprises: applying the second DRX cycle to measurement of the serving cell and measurement of the neighbor cell.

13. The UE of claim 1, wherein the first DRX cycle is determined by the serving cell based on the DRX cycle threshold.

\* \* \* \* \*